(12) United States Patent
Sheidler et al.

(10) Patent No.: US 8,897,943 B2
(45) Date of Patent: Nov. 25, 2014

(54) BATTERY ELECTRIC HYBRID DRIVE FOR A COMBINE HARVESTER

(71) Applicant: Deere & Company, Moline, IL (US)

(72) Inventors: Alan D Sheidler, Moline, IL (US); Jacob Pence, Dubuque, IA (US); Shannon R Pine, Evans, GA (US)

(73) Assignee: Deere & Company, One John Deere Place, Moline, IL (US)

( * ) Notice: Subject to any disclaimer, the term of this patent is extended or adjusted under 35 U.S.C. 154(b) by 0 days.

(21) Appl. No.: 13/844,336

(22) Filed: Mar. 15, 2013

(65) Prior Publication Data

US 2014/0277879 A1  Sep. 18, 2014

(51) Int. Cl.
*B60W 20/00* (2006.01)
*B60W 10/08* (2006.01)
*B60W 10/06* (2006.01)
*A01D 41/12* (2006.01)

(52) U.S. Cl.
CPC ............... *B60W 20/10* (2013.01); *B60W 10/08* (2013.01); *Y10S 903/93* (2013.01); *B60W 10/06* (2013.01); *A01D 41/12* (2013.01)
USPC ............................. 701/22; 701/110; 903/930

(58) Field of Classification Search
USPC ............. 701/22.5, 51, 54; 180/65.25, 65.265, 180/65.285, 305; 123/350, 357
See application file for complete search history.

(56) References Cited

U.S. PATENT DOCUMENTS

| | | | |
|---|---|---|---|
| 5,327,992 A * | 7/1994 | Boll ........................... | 180/65.25 |
| 7,276,806 B1 | 10/2007 | Sheidler et al. | |
| 7,431,113 B2 | 10/2008 | Deppe | |
| 7,446,426 B2 | 11/2008 | Sheidler et al. | |
| 7,801,653 B2 | 9/2010 | Sheidler et al. | |
| 7,945,378 B2 | 5/2011 | Sheidler et al. | |
| 7,949,442 B2 | 5/2011 | Sheidler et al. | |
| 8,352,155 B2 | 1/2013 | Schindler et al. | |
| 2006/0076171 A1* | 4/2006 | Donnelly et al. ............. | 180/65.2 |
| 2007/0255477 A1* | 11/2007 | Okuda et al. .................... | 701/93 |
| 2009/0150016 A1 | 6/2009 | Hung et al. | |
| 2010/0106343 A1* | 4/2010 | Donnelly et al. ............. | 700/295 |
| 2011/0066308 A1 | 3/2011 | Yang et al. | |
| 2012/0256392 A1* | 10/2012 | Oriet .......................... | 280/425.1 |

(Continued)

FOREIGN PATENT DOCUMENTS

| | | |
|---|---|---|
| EP | 1101650 B1 | 5/2001 |
| EP | 1563724 A1 | 8/2005 |

(Continued)

OTHER PUBLICATIONS

European Search Report, Jul. 8, 2014.

*Primary Examiner* — Marthe Marc-Coleman

(57) ABSTRACT

A hybrid drive system for a combine includes a control wherein the hybrid system control determines a battery pack state-of-charge of the battery pack, and the hybrid system control also receives the current engine load estimate and engine speed from the engine control. Depending upon these variables, the hybrid control sends a torque command to a motor/generator control to provide a desired composite speed-torque curve from the engine and the motor/generator. In cases where the battery pack can be charged, an engine fuel curve is set by engine control to provide maximum engine power at isochronous speed, and when the battery pack is fully charged, the engine fuel curve is reduced to be shaped so that battery electric assist is not engaged until engine speed falls.

21 Claims, 8 Drawing Sheets

(56) References Cited

U.S. PATENT DOCUMENTS

2013/0133480 A1* 5/2013 Donnelly .................. 74/720
2014/0086757 A1* 3/2014 Kang et al. ................ 417/16
2014/0102187 A1* 4/2014 Andreae ................ 73/114.71

FOREIGN PATENT DOCUMENTS

| EP | 1813143 A1 | 8/2007 |
| EP | 1900272 A1 | 3/2008 |
| EP | 2359676 A1 | 8/2011 |

* cited by examiner

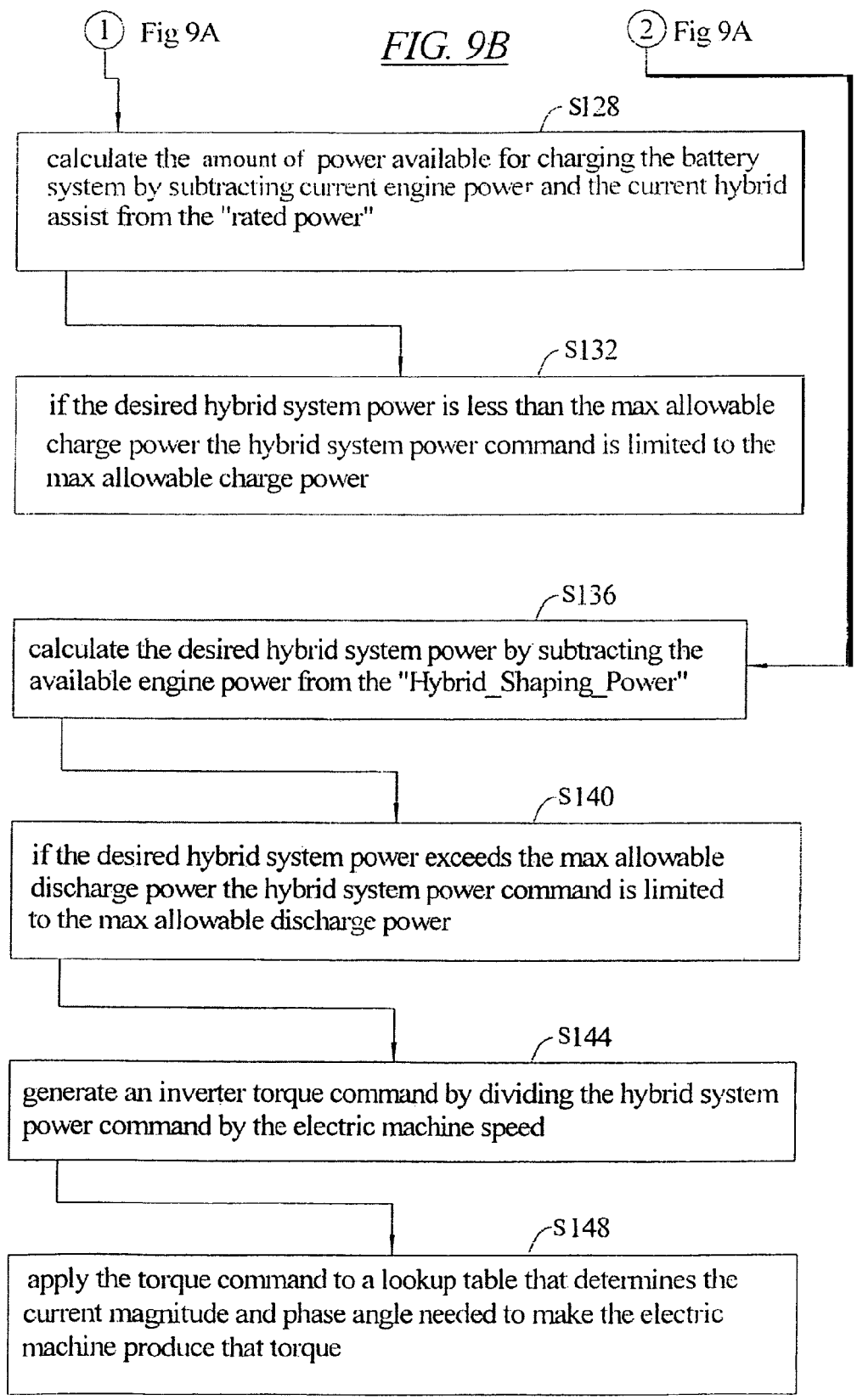

BATTERY ELECTRIC HYBRID DRIVE FOR A COMBINE HARVESTER

TECHNICAL FIELD

This invention relates to an apparatus, system and method for driving a combine harvester with a battery electric hybrid drive.

BACKGROUND

The engine load on an internal combustion engine in a combine harvester or "combine" may increase as the vegetation density or yield increases in certain zones in a field. Internal Combustion ("IC") engines are used to power combines under a wide variety of load conditions and must be able to accept sudden changes in load. When the combine is in a transport mode, sudden increases in power and torque are required from the engine when negotiating the terrain between fields. Tillage in field also presents conditions where there are sudden increases in load due to changes in soil condition, where the resistance of the tillage tool increases significantly or the field has steep inclines. Engines of this type are expected to respond to these conditions by increasing output torque with only a small increase in engine load. This increase in torque output is typically referred to as torque rise. Engines with significant torque rise permit the torque curve to be shaped so that the rate of rise is very steep allowing the engine to decrease rpm very little at the same time output torque increases significantly. Engines that are governed use the shape of the governor curve to make the slope extremely steep for operation at or below rated rpm and torque.

Combine harvesters currently have a basic engine torque curve to provide a nominal rated power at a power level approximately 14% below the power capability envelope of the engine. Experience has shown that a 14% power bulge with a 200 RPM droop in engine speed provides good slug handling capability and enhanced drivability for the operator. This enables the use of a power boost for unloading or a power bulge for additional power to handle gradual increases in a load or to handle slugs or other operational overloads without excessive loss of functional engine speed or the stalling of the engine. Traditional engine torque curves for combines have been developed to use this high level of power bulge above the normal rated power in order to enhance the ability of the power train and threshing system to handle the slugs and transient overloads during the harvesting operation. Such an overload may occur when clumps of moist material suddenly enter the threshing system causing higher, short duration overloads.

At the lower power end of the operational spectrum, combines also spend significant time at very light loads, such as idling or traveling down hills. In these cases, the high end torque curves that work well for performance, such as slug acceptance, high threshing loads, unloading grain on the go, etc., do not return as good fuel economy as an engine torque curve optimized for a lower power level operation.

Current EPA regulations (40 CFR part 1039) titled "Control Of Emissions From New And In-Use Nonroad Compression-Ignition Engines", or referred to as "Final Tier 4" (FT4) are such as to allow higher power diesel engines (>560 kW) to utilize selective catalyst reduction (SCR) units only. Below 560 kW, the specified engine-out emissions are more stringent and in many cases dictate a more aggressive hardware solution. Diesel engines below 560 kW may require exhaust gas recirculation (EGR), diesel particulate filter (DPF) and SCR units to meet the FT4 regulations.

The present inventors have recognized the need for a cost effective, high performance power train for a combine having a peak power over 560 kW.

The present inventors have also recognized that to maintain vehicle drivability in a combine, power bulge is provided so the engine does not stall when the vehicle encounters times of heavy load (crop slugs, going uphill, etc.). About 12-14% power bulge over rated power is desired to be held in reserve to maintain operator drivability. If the engine power held in reserve can be reduced, vehicle productivity and fuel economy can be increased.

The present inventors have recognized that even if the power bulge can be reduced somewhat using a battery electric hybrid system, it would be desirable to reduce IC engine power bulge to near zero. Improvement is desired in battery charging to ensure drivability while reducing IC engine power bulge to near zero. Without the IC engine power bulge, and if the battery pack is not fully charged, the composite vehicle torque-speed curve would change and result in different vehicle drivability to the operator.

The present inventors have recognized that it is desired to modify the system to attempt to capture all of the engine power bulge held in reserve so that full engine power can be used nearly all the time.

The present inventors have also recognized that one of the challenges in using Li-ion batteries is the number of charge/discharge cycles that can be undergone before the battery pack wears out. The present inventors have recognized that a method which reduces the charging/discharging of the battery pack would help extend battery life.

SUMMARY

An exemplary embodiment of the invention provides a power train for a combine that couples a relatively small diesel engine with a battery electric hybrid drive that requires only SCR to meet emissions standards but produces over 600 kW peak power. According to the embodiment, a 13.5 liter diesel engine that produces over 560 kW peak power is used. Typically, 19-20 L engines are used at this power level. While the power curve of the IC engine reaches 560 kW (or more), the hybrid drive contributes electric power boost to support the IC engine and keep its normal operating power level at lower levels to improve longevity.

The hybrid drive includes a battery pack and an electric motor/generator for providing hybrid assist or boost when acting as a motor and for providing charging of the battery pack when acting as a generator.

The embodiment uses a 13.5 L engine up to a peak power of over 560 kW to enable the SCR-only approach, and uses a hybrid electric power unit to provide additional electric boost power when needed to avoid loading the engine to such high levels as much as possible.

The combination of IC engine and electric motor drive provides a mild hybrid diesel-electric system with a battery pack for energy storage. The power level of the engine at rated speed could be set to 480 kW. An isochronous governor can be set at a pre-selected speed (rpm) with governor-to-torque curve break-away at 480 kW. Increasing the load on the engine, the engine speed droops to a first reduced speed, and engine power would taper up to about 500 kW. In addition, the electric drive will build power linearly from 0 kW at the pre-selected speed to 40 kW at the first reduced speed for a combined power (IC engine plus electric motor) of 540 kW at the first reduced speed. This would provide similar 'feel' and drivability for the operator for normal operation, such as stable engine load speed operation in varying transient loading. If overloading occurs above 540 kW, the engine will build to a peak power of over 560 kW at a second reduced speed that is less than the first reduced speed and the electric drive will build to 50 kW for a combined power of over 610 kW at the second reduced speed. The rapid torque rise from the first reduced speed to the second reduced speed will serve to ensure stable vehicle operation while minimizing the exposure of the engine to high overloading.

Thus, the embodiment provides a cost effective, high performance power train for a combine having a 480 kW rated power and over 560 kW peak power, utilizing a small displacement, lower power diesel engine with an SCR unit only. The use of a smaller, lighter weight engine together with the hybrid drive components improves fuel economy and increases vehicle productivity while avoiding heavier larger displacement, industrial engines-less well suited to weight conscious, off-highway combines.

As a further aspect of embodiments of the invention, a battery electric hybrid system is combined with a diesel engine wherein the diesel engine is isochronously governed and the battery electric system is used to provide the power bulge as the IC engine speed droops. The engine fuel curve is variably controlled to allow for optimal charging of the battery pack while still maintaining the same torque-speed curve feel of a conventional, non-hybrid combine to the operator. This feature will allow more of the engine capability to be used, increasing productivity and fuel economy.

The engine control unit (ECU) receives a battery pack state of charge (SOC) estimate, battery pack voltage, battery pack current, and safe operating current limits, from a battery control. The ECU also receives or calculates the current engine load estimate and engine speed. Depending upon the variables, a torque command is sent to a motor/generator control unit to provide the desired composite (electric motor/IC engine) speed-torque curve.

In cases where the battery pack can be charged up, the engine fuel curve is set to provide maximum engine power at isochronous speed.

After the battery pack is charged, it provides the power bulge by a combination of electric assist and slowly releasing battery charging power as the engine speed droops. Utilizing full engine power, the fuel economy should be improved and the battery pack kept at a higher average SOC.

When the battery pack is fully charged, the engine fuel curve is reduced to maintain an effective composite torque-speed curve and a consistent drivability performance to the operator. When the fuel curve is decreased, it is shaped so that battery electric assist is not engaged until engine speed falls below a pre-determined isochronous speed set by an isochronous governor, to a pre-determined reduced speed. Because the battery pack electric assist is not used until engine speed falls, the battery pack should be charged/discharged less often, reducing the number of charge/discharge cycles it goes through and improving battery pack life.

The end result of this system should be a more productive and fuel efficient hybrid combine system.

More specifically, the battery pack control continuously monitors battery current, individual cell voltage, and individual cell temperature. From these measurements the battery pack control calculates the battery pack state of charge (SOC) using methods typical of the industry (i.e. "coulomb counting"). The battery pack control also measures the output DC voltage using standard sensors. The battery pack control reports the value of its SOC, average cell temperature (sum of all cell temperatures divided by number of cells), and output voltage to the ECU every 10 ms over the CAN bus.

The motor/generator control includes a standard voltage source inverter that can convert DC voltage/current to AC voltage/current and vice versa. The motor/generator control receives a torque command over the CAN bus from the ECU every 10 ms. The motor/generator control takes this torque command and applies the value to a lookup table (predetermined by test) that specifies the current magnitude and phase angle needed to make the motor/generator to produce that torque. The inverter then uses current regulation as is typical in the industry to generate these currents in the motor/generator which then produces the desired torque on the shaft. Depending upon the torque command, the power flow can be either from the battery pack converted to mechanical power to support the engine or the flow can convert mechanical power to electrical power which is then stored in the battery pack. The motor/generator control also interfaces to a position sensor on the motor/generator. The motor/generator speed is calculated from the position data by taking a discrete time derivative.

The motor/generator is connected to the engine, such as by use of an integrated gear box from which the torque produced by the motor/generator adds/subtracts to that of the engine. The motor/generator speed can have a fixed ratio to that of the engine.

The ECU controls the fueling to the engine. The ECU knows the amount of fuel it is applying and also measures the engine speed as is typical of the industry. The fueling is controlled so that the speed is isochronously governed by the ECU at the pre-determined isochronous speed with a power bulge for decreasing speeds. The ECU maintains the pre-determined isochronous speed of the engine until the engine torque reaches what is known as the "rated condition" which can vary. After the torque reaches this point the ECU no longer governs the speed to the pre-determined isochronous speed. The ECU commands additional torque in proportion to the difference between the current speed and the isochronous speed.

It is easiest to view how the ECU regulates engine speed in response to increasing load by evaluating the power-speed curves instead of torque-speed curves. The engine power is the engine torque multiplied by the engine speed with appropriate conversion factors for units. The ECU uses a first curve where there is no power bulge and full engine power is made available at the isochronously governed speed. The ECU also uses a second curve that isochronously governs the engine speed until the engine output torque/power reaches a certain torque/power level. For engine loads above that torque/power level, the ECU increases engine torque by an amount in proportion to the difference between the current speed and the isochronous speed where the engine speed is determined by the mechanical system. The ECU calculates the torque produced by the engine by applying the known commanded fueling level to a look up table (predetermined by test) which accounts for losses so that the reported engine torque is what is available at the crankshaft.

The ECU determines which power-speed curve to use for engine speed governing. If the battery pack SOC is less than a pre-selected upper limit (for example 60% of maximum SOC), the ECU uses the first power-speed curve ("fast recharging"). If the battery pack SOC is greater than the pre-selected upper limit, the ECU uses the second power speed curve ("fully charged").

The ECU calculates the current engine power (kW) by multiplying the Engine Output Torque (Nm) and Engine Speed (RPM) and a conversion factor.

The ECU calculates the "Hybrid_Shaping_Power" needed from the hybrid system to shape the overall vehicle torque as desired by taking the engine speed and applying that signal to a look up table (pre calculated values). The lookup table for each operating case takes in engine speed and outputs a power.

The ECU calculates the amount of power it has available for charging the battery pack by subtracting current engine power and the current hybrid assist from the "rated power" depending on the first or second curve selected.

The ECU calculates the maximum power than can be used to discharge and charge the battery pack by applying the battery pack SOC and average cell temperature signals to a look up table which outputs the maximum allowable discharging and charging current at this time (look up tables predetermined by test). These currents are then multiplied by the battery pack output voltage to determine the maximum allowable power to be used for discharging and charging. Discharging power is positive and charging power is negative.

The lookup tables are determined by allowing for the maximum allowable charge/discharge current the battery can withstand thermally, or another limit, when the SOC is between a first lower limit (for example 40% of maximum SOC) and the first upper limit (for example 60% of maximum SOC). When the SOC is below first lower limit, the amount of allowable discharge current is linearly reduced from the first lower limit to 0 Amps at a second, lesser lower limit (for example 30% of maximum SOC). When the SOC is above the first upper limit, the amount of allowable charge current is linearly reduced from the value at the first upper limit to 0 Amps at a second higher upper limit (for example 70% of maximum SOC). This is done to maximize the battery pack life.

The ECU calculates the desired hybrid system power by subtracting the available engine power from the "Hybrid_Shaping_Power." If the result exceeds the maximum allowable discharge power value or is less than the maximum allowable charge power value (charging power being negative) the hybrid system power is limited to the maximum allowable discharge power value for discharging the battery pack during hybrid assist or to the maximum allowable charge power value during charging of the battery pack.

The inverter torque command is generated by dividing the hybrid power command by the motor/generator speed as reported by the inverter (in rad/sec) to calculate a torque command in Nm units. The ECU then transmits this torque command to the inverter by CAN bus.

In the hybrid system, energy is stored in the battery pack and used to provide the power bulge. During times of less than rated loading, the battery pack is charged back up. This allows the "rated power" to be set higher, closer to, or equal to peak power, for the same IC engine without sacrificing power bulge.

When the SOC is between the first lower limit and the first upper limit of SOC (for example 30% and 60% of maximum SOC), the ECU commands the engine power curve and hybrid motor/generator power for the less than fully charged mode. The engine provides maximum power at isochronous speed, and the battery pack provides the power bulge. The hybrid system charges at a power level of desired power bulge minus available discharge power (function of battery pack SOC and battery cell temperature) at isochronous speed, linearly decreasing the charging as the engine speed drops (resulting in more apparent power to the vehicle). This sets the apparent "rated power" to the vehicle. In this way the desired power bulge is provided. If the engine speed is at the isochronous speed and the engine load is less than "rated power" the hybrid system can charge at a power level substantially equal to the difference between the "rated power" and current engine power keeping the engine fully loaded.

When the SOC is above the first upper limit of SOC, the ECU commands the Engine Curve Power to be at a level below maximum power in the fully charged mode. The hybrid system provides zero assist until the engine hits maximum power. The engine speed that the hybrid assist starts is selected to be under the speed operators typically operate at (2150 RPM or above is the engine speed operators typically target). This is done to limit the amount of charging/discharging of the battery pack and extends battery pack life.

Numerous other advantages and features of the present invention will become readily apparent from the following detailed description of the invention and the embodiments thereof, from the claims and from the accompanying drawings.

BRIEF DESCRIPTION OF THE DRAWINGS

FIGS. 9A and 9B together are a flow diagram of a method according to one method of the invention.

DETAILED DESCRIPTION

Figure 1:
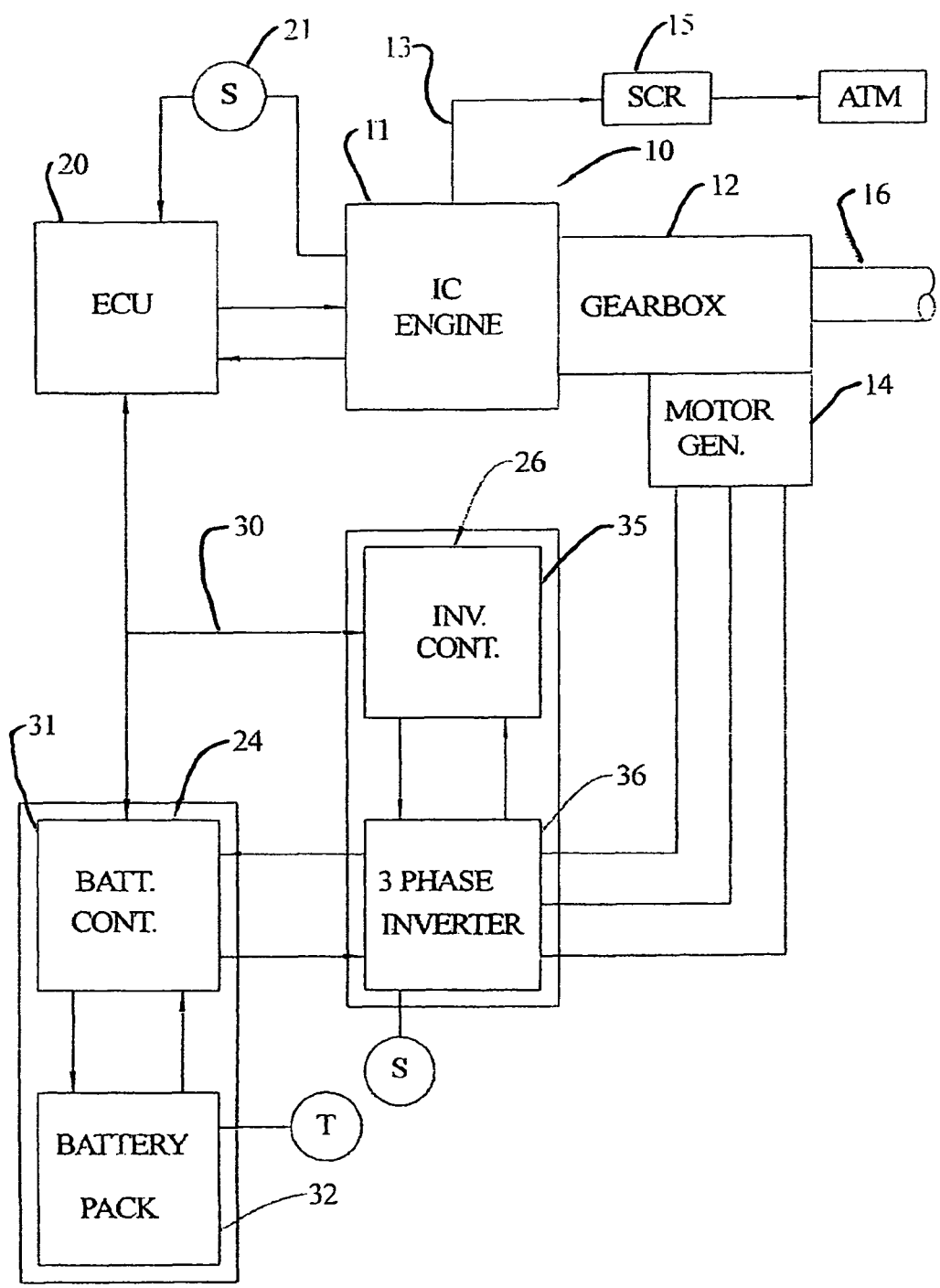
FIG. 1 is a block diagram of one embodiment of a system for a battery-electric hybrid drive for a combine harvester.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

In accordance with one embodiment, FIG. 1 illustrates a system 10 for a battery electric hybrid drive for a combine harvester. The system 10 comprises an internal combustion engine 11 mechanically coupled to gearbox 12. An electric motor/generator 14 is also coupled to the gearbox 12. The engine 11 includes an exhaust path 13 through an SCR unit 15 and to atmosphere.

In turn, the output 16 (e.g., output shaft) of the gearbox 12 provides rotational energy for propelling the vehicle, operating implements, or both.

An electronic control unit (ECU) 20 is signal connected to engine controls and sensors.

An engine speed sensor 21 (e.g., revolution per minute (RPM) sensor) is associated with the internal combustion engine 11. The output of the engine speed sensor is provided directly or indirectly to the ECU 20. If the engine speed sensor provides an analog output signal, an analog-to-digital (A/D) converter may be interposed between the engine speed sensor and the data processor.

The ECU 20 communicates with one or more of the following devices: the IC engine 11, an electrical energy storage device 24, and a motor/generator control 26.

The lines interconnecting the foregoing devices 11, 24, 26 with the ECU 20 may represent one or more logical data paths, physical data paths, or both. For example, the interconnections may be realized as a databus or CAN bus 30.

The energy storage device 24 can comprise a battery control 31 and a battery pack 32. The databus 30 is signal connected to the battery control 31.

The motor/generator control 26 can comprise an inverter control 35 that is signal-connected to a three-phase inverter 36. The databus 30 is signal connected to the inverter control 35.

The electric motor/generator 14 may operate in at least two modes: an electric propulsion mode and a power generation mode. In the electric propulsion mode, the electric motor/generator 14 acts as a motor where both an electric motor 14 and the engine 11 are active and propel the vehicle.

In the power generation mode, the electric motor/generator 14 acts as a generator. For example, in the power generation mode the engine 11 may drive the electric motor/generator 14.

In one configuration, the electric motor/generator 14 may comprise a direct current (DC) motor and a direct current (DC) generator.

In an alternative embodiment, the electric motor/generator 14 may comprise an alternating current (AC) motor/alternator that consumes and generates alternating current. If the electric motor/generator 14 or generator produces alternating current, a rectifier (e.g., full wave bridge rectifier or diode circuit) may be positioned between the electric motor/generator 14 and the energy storage device 24.

The motor/generator control 26 (e.g., inverter or variable voltage source) is capable of providing a motor/generator control signal to the electric motor/generator 14. The motor/generator control signal may be used to control any of the following: motor rotational speed, motor torque, motor rotational direction, motor active or inactive status, and motor duty cycle.

The electric motor/generator 14 described has an alternating current configuration and the motor/generator control 26 comprises an inverter control 35 and three phase inverter 36 that converts direct current electric energy from the energy storage device 24 into alternating current. The inverter may comprise a chopper circuit, a switching circuit, or a variable frequency oscillator for controlling the frequency, phase, or pulse duration of the motor/generator control signal to regulate or adjust an electric motor speed of the electric motor/generator 14.

Alternately, if the electric motor/generator 14 is a direct current configuration, the motor/generator control 26 may comprise a variable voltage source. The variable voltage source controls the voltage level or current level of the control signal to regulator or adjusts an electric motor speed of the electric motor/generator 14.

The energy storage device 24 comprises a battery pack 32. Alternately it could comprise an ultra-capacitor, a network of capacitors, a combination of the foregoing devices, or another storage device.

The energy storage device 24 receives and stores electrical energy generated by the electric motor/generator 14 in a power generation mode. The energy storage device 24 supplies stored electrical energy to the motor/generator control 26 in an electric propulsion mode.

The ECU 20 may comprise a microcontroller, a microprocessor, a digital signal processor, a programmable logic array, a logic device, or another device for processing data (e.g., sensor data provided by the engine speed sensor, the battery control 31, the inverter control 26, or a torque sensor). The ECU 20 may include a data storage device and data storage and retrieval software or instructions for retrieving or accessing reference data stored in the data storage device. The ECU 20 comprises an evaluator for evaluating or comparing engine speed data, engine torque data, energy storage status data (e.g., state-of-charge data), or other sensor data to reference data stored in the data storage device. The reference data may comprise baseline torque curve data, supplemental torque curve data, and engine speed data, for example.

The battery control 31 comprises a system for monitoring the energy storage status or state of charge (SOC) of the energy storage device 24 (e.g., battery pack). The battery control 31 may comprise one or more of the following components: a data processing device (e.g., microcontroller) or logic device, an ammeter or current meter, a volt meter, a thermometer, and a clock. The SOC represents the remaining capacity of a battery or electrical storage device in a charge/discharge cycle. The SOC may be expressed as a percentage of the remaining capacity to the full charge capacity or maximum SOC of a cycle-aged battery. In one embodiment, the SOC of the electrical storage device may be estimated by measuring current drain and voltage levels at regular time intervals. In another embodiment, the SOC may be based on a battery model that takes into account one or more of the following: charging voltage, charging time, charging temperature, discharge rate, discharge temperature, charge recovery, cycle aging, electrochemical composition factors, and an electrical equivalent circuit. The state-of-charge data may be time-stamped or associated with a temporal indicator.

An exemplary embodiment of the invention provides a power train for a combine that couples a relatively small diesel engine 11 with a battery electric hybrid drive that requires only an SCR unit 15 to meet emissions standards but produces over 600 kW peak power. According to the embodiment, a 13.5 liter diesel engine 11 that produces 563 kW peak power is used. Typically, 19-20 L engines are used at this power level. While the torque curve of the IC engine reaches 563 kW (or more), the electric drive contributes electric power boost to support the IC engine and keep it's normal operating power level at much lower levels to improve longevity.

The embodiment uses a 13.5 L engine up to a peak power of 563 kW to enable the SCR-only approach, and to use a hybrid electric motor 14 to provide additional electric boost power when needed to avoid loading the engine to such high levels as much as possible.

Figure 2:
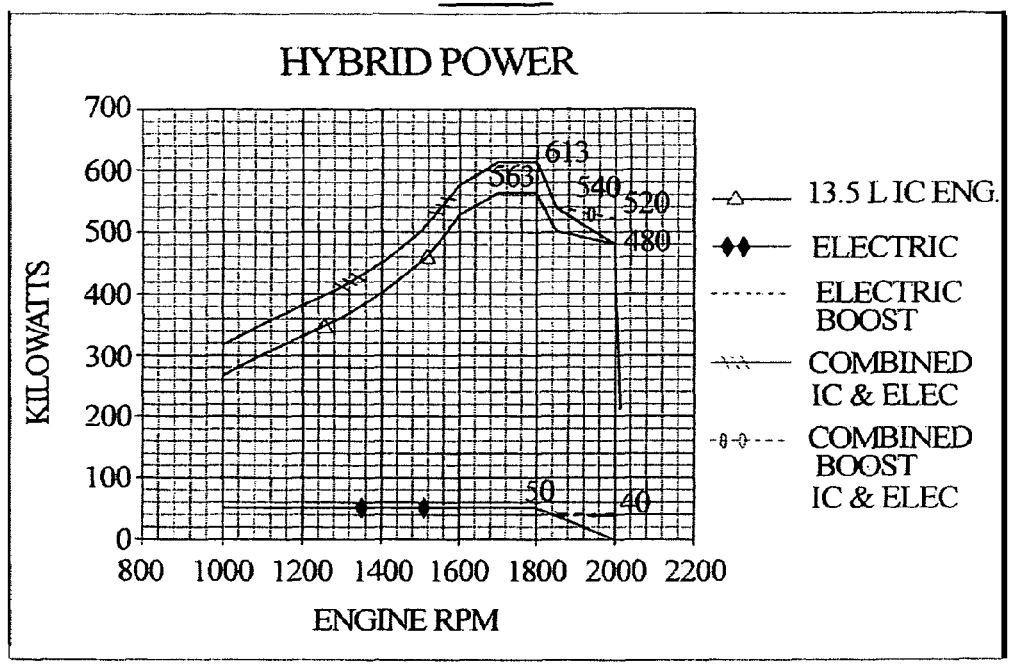
FIG. 2 is a graphical diagram of power vs. engine speed for an IC engine with a battery electric hybrid drive.
Figure 3:
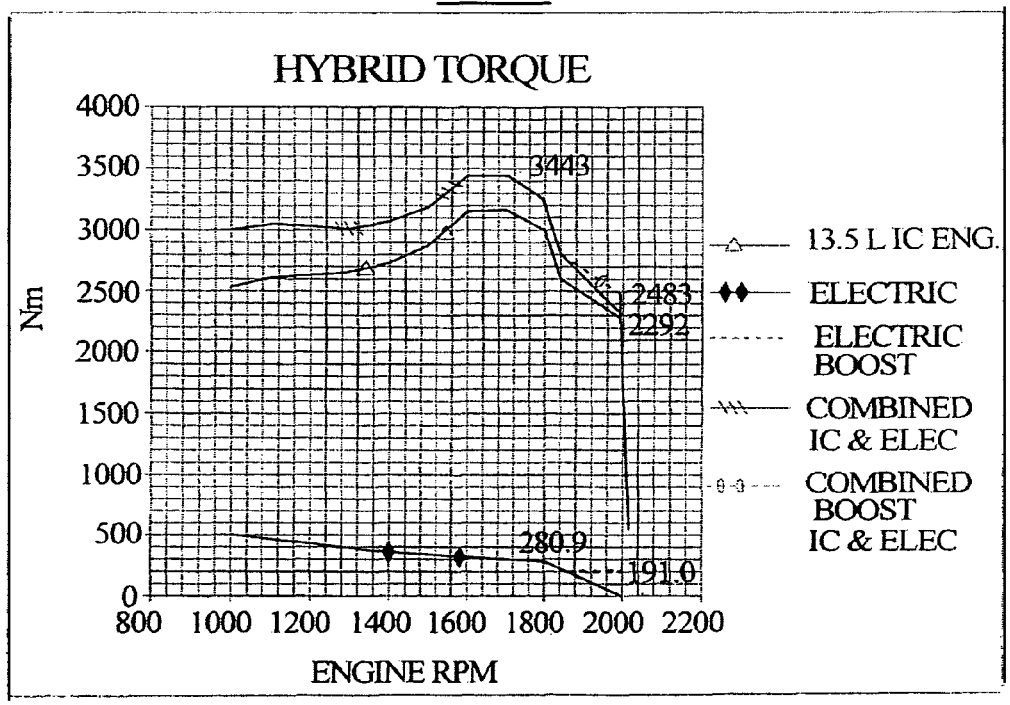
FIG. 3 is a graphical diagram of torque vs. engine speed for an IC engine with a battery electric hybrid drive.

The combination provides a mild hybrid diesel-electric system with a battery pack 32 for energy storage as demonstrated in FIGS. 2 and 3. The legend for these figures is the following:

"13.5 L IC Eng" refers to the curve for a 13.5 liter diesel engine.

"Electric" refers to the hybrid assist, i.e., the power provided by the battery pack and the motor/generator, either positive or negative.

"Electric boost" refers to the special operating circumstance where additional power is drawn from the hybrid assist, i.e., the power provided by the battery pack and the motor/generator.

"Combined IC and Elec" refers to the composite curve showing the sum of power or torque from the IC engine and the hybrid assist, i.e., the power provided by the battery pack and the motor/generator, either positive or negative.

"Combined boost IC and Elec" refers to the composite curve showing the sum of power or torque from the IC engine and the hybrid assist during the special operating circumstance.

The power level of the engine at rated speed (~2000 rpm) would ideally be set to 480 kW. An isochronous governor within the ECU can be set at 2000 rpm with governor-to-torque curve break-away at 480 kW. Pulling down the torque curve to 1850 rpm, the engine power would taper up to 500 kW. In addition, the electric drive 14 will build power linearly from 0 at 2000 rpm to 40 kW at 1850 rpm for a combined power of 540 kW at 1850 rpm. This would provide similar 'feel' and drivability for the operator for normal operation, such as stable engine load speed operation in varying transient loading. If overloading occurs above 540 kW, the engine will build to a peak power of 563 kW at 1800 rpm and the electric drive will build to 50 kW for a combined power of 613 kW at 1800 rpm. The rapid torque rise from 1850 to 1800 rpm will serve to ensure stable vehicle operation while minimizing the exposure of the engine to high overloading.

Thus, the embodiment provides a cost effective, high performance power train for a combine having a 480 kW rated power and over 560 kW peak power, utilizing a small displacement, lower power diesel engine with an SCR unit 15 only without need for EGR and DPF units.

Both FIGS. 2 and 3 illustrate "Boost" power or torque. Boost power is power provided by the IC engine and the hybrid assist for certain operating circumstances. For example, when a combine is unloaded during operation, grain is moved from the combine grain tank into a truck while both the combine and the truck are moving during combine operation. The unloading of the grain requires power to operate augers. So as not require the combine to slow down, a boost function, shown by dashed lines in FIGS. 2 and 3. In FIG. 2, the boost power is provided by 40 kW from the hybrid assist, i.e., the battery pack and the motor 14. In FIG. 3, the boost torque is provided by 191 Nm from the hybrid assist, i.e., the battery pack and the motor 14.

As a further embodiment, a battery electric hybrid system is provided where the diesel engine is isochronously governed and the battery electric system is used to provide the power bulge as the speed droops. The engine fuel curve is variably controlled to allow for optimal charging of the battery pack while still maintaining the same torque-speed curve feel to the operator. This feature will allow more of the engine capability to be used, increasing productivity and fuel economy.

FIGS. 4-8 describe results demonstrated using a 9.0 liter IC engine. This embodiment also encompasses other sizes of IC engines including the 13.5 liter engine of FIGS. 2-3.

The ECU 20 receives the SOC estimate, battery pack voltage, battery pack current, and safe operating current limits from the battery control 31. The ECU 20 also receives or calculates the current engine load estimate and engine speed. Depending upon the variables, a torque command is sent to the inverter control 35 to provide the desired composite (electric motor/IC engine) speed-torque curve.

Figure 4:
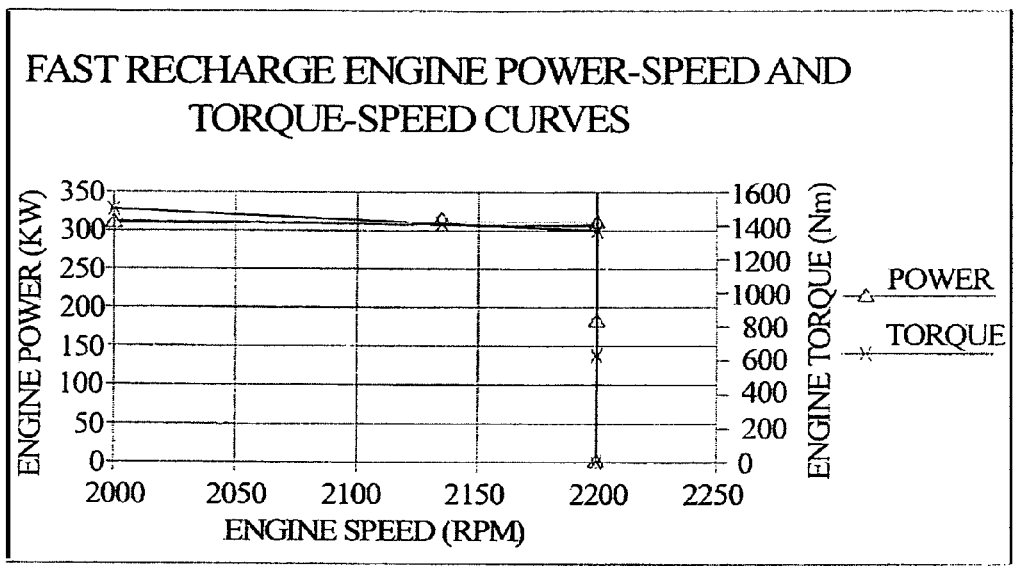
FIG. 4 is a graphical diagram of a power and torque vs. engine speed curve for an IC engine, to be used with a battery electric hybrid drive in a fast recharge mode of operation.
Figure 5:
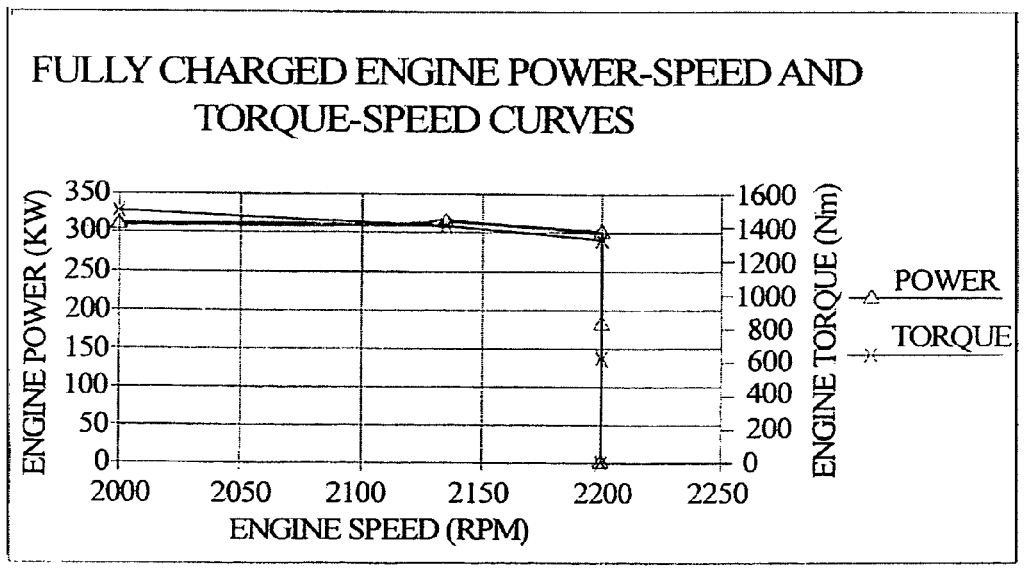
FIG. 5 is a graphical diagram of a power and torque vs. engine speed curve for an IC engine to be used with a battery electric hybrid drive in a fully charged mode of operation.

In cases where the battery pack can be charged up, the engine fuel curve is set to provide maximum engine power at isochronous speed shown in FIG. 4. Once charged, the battery pack can provides the power bulge by a combination of electric assist and slowly releasing battery charging power as the engine speed droops (FIG. 5). Utilizing full engine power, the fuel economy should be improved and the battery pack kept at a higher average SOC.

When the battery pack is fully charged, the engine fuel curve is reduced to maintain the same composite torque-speed curve and a consistent drivability performance to the operator as shown in FIG. 5. When the fuel curve is decreased, it is shaped so that battery electric assist is not engaged until engine speed falls below 2130 RPM (isochronous governor being set at 2200 RPM). When this is done, the battery pack should be charged/discharged less often reducing the number of charge/discharge cycles it goes through improving battery pack life.

The end result of this system should be a more productive and fuel efficient hybrid combine system.

More specifically, the battery control 31 continuously monitors battery current, individual cell voltage, and individual cell temperature. From these measurements the battery pack calculates the battery pack state of charge (SOC) using methods typical of the industry (i.e. "coulomb counting"). The battery control 31 also measures the output DC voltage using standard sensors. The battery control 31 reports the value of battery pack SOC, average cell temperature (sum of all cell temperatures divided by number of cells), and output voltage to the ECU every 10 ms over the CAN bus.

The motor/generator control 26 is a standard voltage source inverter that can convert DC voltage/current to AC voltage/current and vice versa. The inverter control 35 receives a torque command over the CAN bus 30 from the ECU 20 every 10 ms. The inverter control 35 takes this torque command and applies the value to a lookup table (predetermined by test) that specifies the current magnitude and phase angle needed to make the motor/generator to produce that torque. The inverter 36 then uses current regulation as is typical in the industry to generate these currents in the motor/generator which then produces the desired torque to the gear box 12. Depending upon the torque command the power flow can be either from the battery pack converted to mechanical power to support the engine or the flow can convert mechanical power to electrical which is then stored in the battery pack 32 via the battery control 31. The inverter control 35 also interfaces to a position sensor on the motor/generator. The motor/generator speed is calculated from the position data by taking a discrete time derivative.

The ECU 20 controls the fueling to the engine 11. The ECU controls the amount of fuel it is applying and also measures the engine speed as is typical of the industry. The fueling is controlled so that the speed is isochronously governed at 2200 RPM with a power bulge. The ECU regulates the speed of the engine until the engine torque reaches what is known as the "rated condition" which can vary. After the torque reaches this point the ECU no longer governs the speed to isochronous speed. The ECU commands additional torque in proportion the difference between the current speed and the isochronous speed (i.e. in this case K*(2200 RPM−Actual Engine Speed).

It is easiest to view how the ECU regulates engine speed in response to increasing load by evaluating the power-speed curves instead of torque-speed curves. The engine power is the engine torque multiplied by the engine speed with appropriate conversion factors for units. The ECU uses two curves. A first curve is shown in FIG. 4. In the first curve there is no power bulge and full engine power is made available at the isochronously governed speed. A second curve is shown in FIG. 5 and isochronously governs the engine speed to 2200 RPM until the engine output torque reaches 1316 Nm (303 kW). For engine loads above that torque/power level, the ECU increases engine torque by an amount proportional to the difference between the isochronous speed (2200 RPM) and the current engine speed (engine speed being determined by the mechanical system). The rate at which torque is increased is such that the engine reaches its maximum rated power at 2130 RPM (317 kW) as shown in FIG. 5. The ECU calculates the torque produced by the engine by applying the known commanded fueling level to a look up table (predetermined by test) which accounts for losses so that the reported engine torque is what is available at the crankshaft.

Based on the above, the following signals are available to the ECU 20
- a. Battery pack SOC—from battery control 31 via CAN bus 30
- b. Battery Pack Cells Average Temp—from battery control 31 via CAN bus 30
- c. Motor/generator Speed—from inverter control 35 via CAN bus 30
- d. Engine Output Torque—internal ECU calculation
- e. Engine Speed—internal ECU calculation The ECU is also able to command the inverter control 35 to produce a desired torque in the motor/generator 14. This command is sent via CAN bus 30.

With the signals above the ECU performs the following calculations:

The ECU determines if it should be using the power-speed curve from FIG. 4 or FIG. 5 for engine speed governing. If the battery pack SOC is less than 60%, the ECU uses the power-speed curve in FIG. 4 ("fast recharging"). If the battery pack SOC is greater than 60%, the ECU uses the power speed curve of FIG. 5 ("fully charged").

The ECU calculates the current engine power by multiplying the Engine Output Torque (Nm) and Engine Speed (RPM) and a conversion factor.

Figure 6:
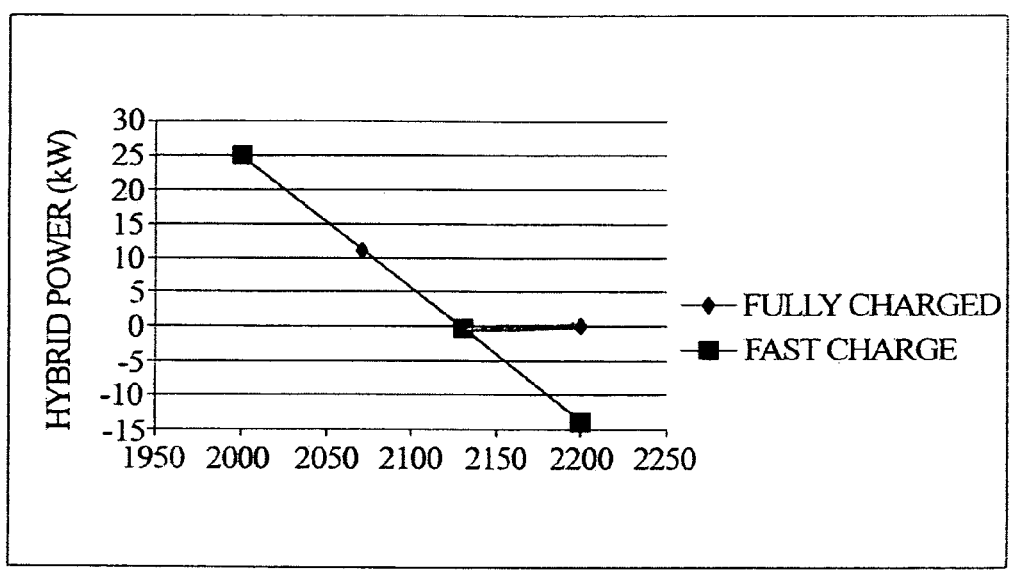
FIG. 6 is a graphical diagram of hybrid power command vs. engine speed for the IC engine of FIGS. 4 and 5 showing both a fast recharge mode of operation and a fully charged mode of operation.

The ECU calculates the "Hybrid_Shaping_Power", the power needed from the hybrid system to shape the overall vehicle torque as desired by taking the Engine Speed and applying that signal to a look up table (pre calculated values). The lookup table for each operating case takes in engine speed and outputs a power as shown in FIG. 6.

The ECU calculates the amount of power it has available for charging the battery pack by subtracting current engine power and the current hybrid assist from the "rated power" (either 317 kW or 303 kW) depending on the curve selected.

The ECU 20 calculates the maximum power than can be used to discharge and charge the battery pack by applying the battery pack SOC, and average cell temperature signals to a look up table which outputs the maximum allowable discharging and charging current at this time (look up tables predetermined by test). These currents are then multiplied by the battery pack output voltage to determine the maximum allowable power to be used for discharging and charging. Discharging power is positive and charging power is negative.

The lookup tables are determined by allowing for the maximum allowable charge/discharge current the battery pack can withstand thermally when the SOC is between 40% and 60%. When the SOC is below 40% the amount of allowable discharge current is linearly reduced from the value at 40% to OA at 30% SOC. When the SOC is above 60% the amount of allowable charge current is linearly reduced from the value at 60% to OA at 70% SOC. This is done to maximize the battery pack life.

The ECU calculates the hybrid system torque command (the one sent to the inverter) as follows:

The ECU 20 measures/calculates engine speed and engine torque (engine torque equivalent to load).

The ECU calculates the desired hybrid system power by subtracting the available engine power from the "Hybrid_Shaping_Power."

If the result exceeds the maximum allowable discharge power value or is less than the maximum allowable charge power value (charging power being negative) the hybrid system power is limited to the maximum allowable discharge power value for discharging the battery pack during hybrid assist or to the maximum allowable charge power value during charging of the battery pack.

The inverter torque command is generated by dividing the hybrid power command by the motor/generator speed as reported by the inverter control (in rad/sec) to calculate a torque command in Nm units. The ECU then transmits this torque command to the inverter control 35 by CAN bus 30.

The battery control 31 calculates and communicates battery pack SOC and Cell Temperatures to the ECU 20 via the CAN bus 30.

The inverter control 35 accepts torque commands from the ECU 20 via the CAN bus 30 and applies current to Motor/Generator 14 to produce requested torque (to provide desired charging or assist power).

Conventional combine operation is to have the ECU isochronously govern the engine at a desired speed. The speed is held until the engine speed reaches "rated power" (less than max engine power). Once engine load exceeds "rated power" the ECU allows a linear droop in speed/increase in power to the peak power point known as power bulge. The slope of the power bulge is critical in maintaining control of the vehicle and the "feel" of the vehicle to the operator. It is desirable to make the "rated power" as high as possible to increase productivity and increase fuel economy, but must be traded off with power bulge slope and available engine power.

In the hybrid system of the embodiment, energy is stored in the battery pack and used to provide the power bulge. During times of less than rated loading, the battery pack is charged back up. This allows the "rated power" to be set higher for the same engine without sacrificing power bulge.

It is desirable to use the battery pack power as little as possible to extend battery life and use the lowest amount of power. It may be advantageous to use a battery pack that can just barely support the desired power bulge.

Figure 7:
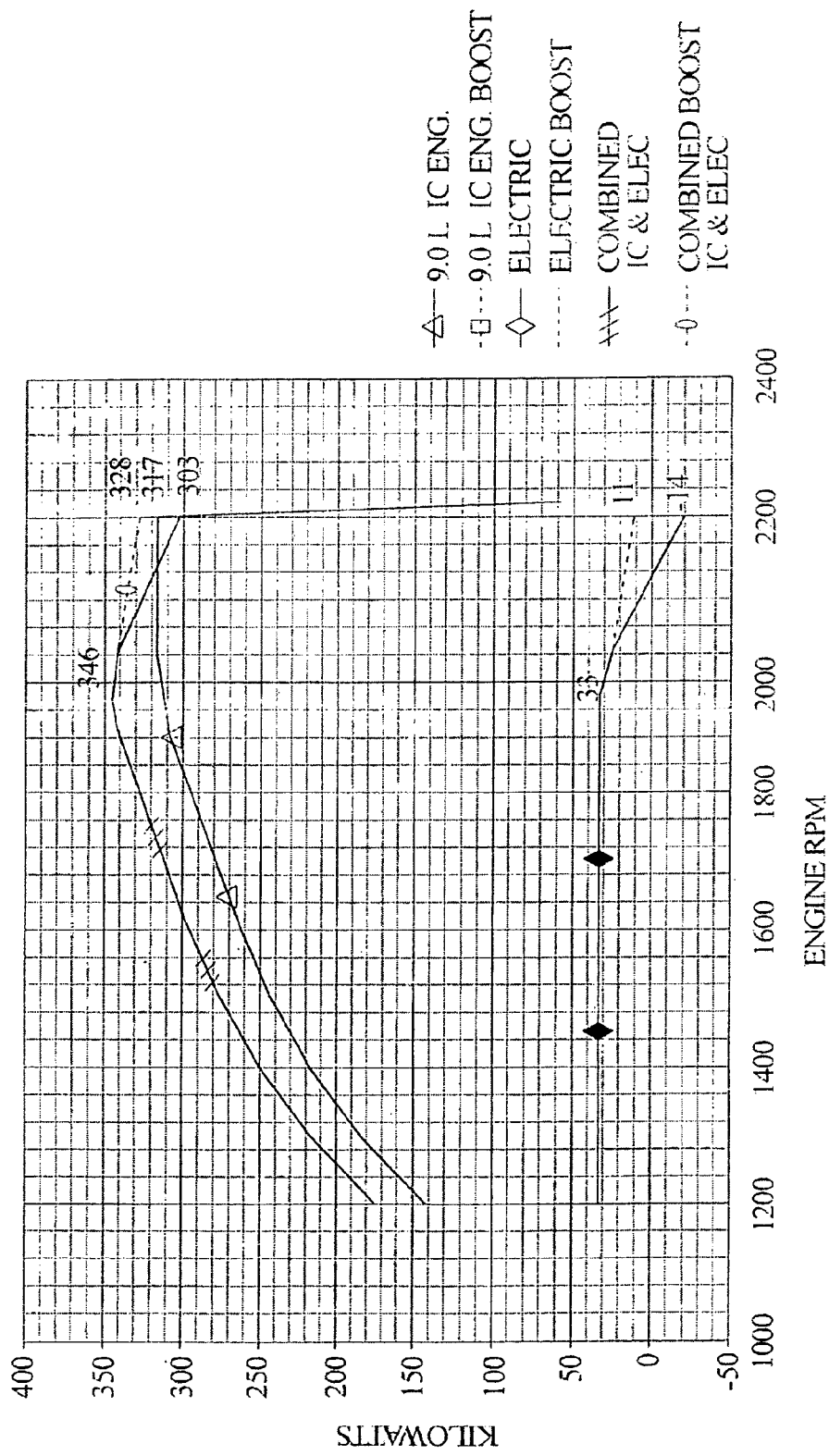
FIG. 7 is a graphical diagram of power vs. engine speed for the IC engine of FIG. 4 and a battery electric hybrid drive in a fast recharge mode of operation showing the engine power and electric motor/generator power and a composite thereof.
Figure 8:
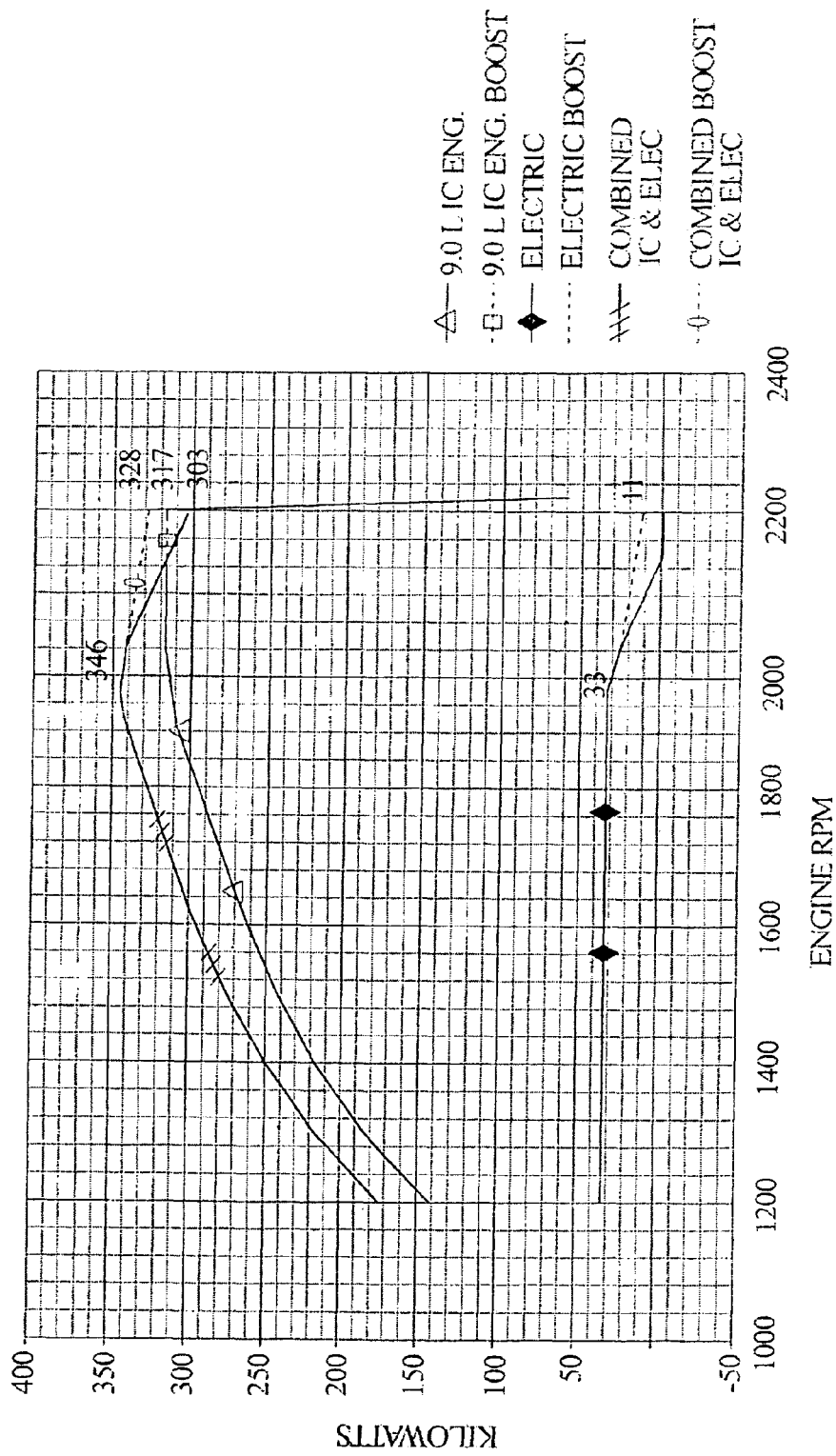
FIG. 8 is a graphical diagram of power vs. engine speed for the IC engine of FIG. 5 and a battery electric hybrid drive in a fully charged mode of operation showing the engine power and electric motor/generator power and a composite thereof.

FIGS. 7 and 8 illustrate two operating conditions for the hybrid system. The legend for the Figures is the following:

"9.0 L IC Eng" refers to the curve for a 9.0 liter diesel engine.

"9.0 L IC Eng. Boost refers to the special operating circumstance where additional power is drawn from the 9.0 liter diesel engine "Electric" refers to the hybrid assist, i.e., the power provided by the battery pack and the motor/generator, either positive or negative.

"Electric boost" refers to the special operating circumstance where additional power is drawn from the hybrid assist, i.e., the power provided by the battery pack and the motor/generator.

"Combined IC and Elec" refers to the composite curve showing the sum of power or torque from the IC engine and the hybrid assist, i.e., the power provided by the battery pack and the motor/generator, either positive or negative.

"Combined boost IC and Elec" refers to the composite curve showing the sum of power or torque from the IC engine and the hybrid assist during the special operating circumstance described herein as boost.

When the SOC is between 30% and 60%, the ECU 20 commands the engine power curve and hybrid motor/generator power as shown in FIG. 7. The engine provides max power 317 kW at isochronous speed 2200 RPM and the battery pack provides the power bulge. The hybrid system charges at a power level of desired power bulge minus available discharge power, being a function of battery SOC and battery cell temperature, at isochronous speed, linearly decreasing the charging from −14 kW to 33 kW as the engine speed drops (resulting in more apparent power to the vehicle). This sets the apparent "rated power" of the combine to 303 kW composite power with 14 kW of engine power charging the hybrid system, i.e., the battery pack. In this way the desired power bulge can always be provided up to 346 kW composite power. If the engine speed is at the isochronous speed and the engine load is less than "rated power" the hybrid system will charge at a power level equal to the difference between the "rated power" and current engine power keeping the engine fully loaded.

When the SOC is above 60%, the ECU commands the Engine Curve Power to be at a power level 303 kW at isochronous speed below the maximum power 317 kW as shown in FIG. 8. The hybrid system provides zero kW assist until the engine hits peak power 317 kW at about 2130 rpm from rated power 303 kW at isochronous speed 2200 rpm, and then the hybrid assist linearly ramps up to 33 kW. The engine speed that the hybrid assist starts is selected to be under the speed operators typically operate at (2150 RPM or above is the engine speed operators typically target). This is done to limit the amount of charging/discharging of the battery pack and extend battery pack life. This sets the rated power of the combine to 303 kW power with a power bulge provided by the hybrid system to 346 kW composite power.

Both FIGS. 7 and 8 illustrate "Boost" power. Boost power is power provided by the IC engine and the hybrid assist for certain operating circumstances. For example, when a combine is unloaded during operation, grain is moved from the combine grain tank into a truck while both the combine and the truck are moving during combine operation. The unloading of the grain requires power to operate augers. So as not require the combine to slow down, a boost function, shown by dashed lines in FIGS. 7 and 8. In FIG. 7, the boost is provided by 11 kW from the hybrid assist and 14 kW from the IC engine which no longer charges the battery pack during this operation. In FIG. 8, the boost is provided by 11 kW from the hybrid assist and 14 kW from the IC engine.

Figure 9A:
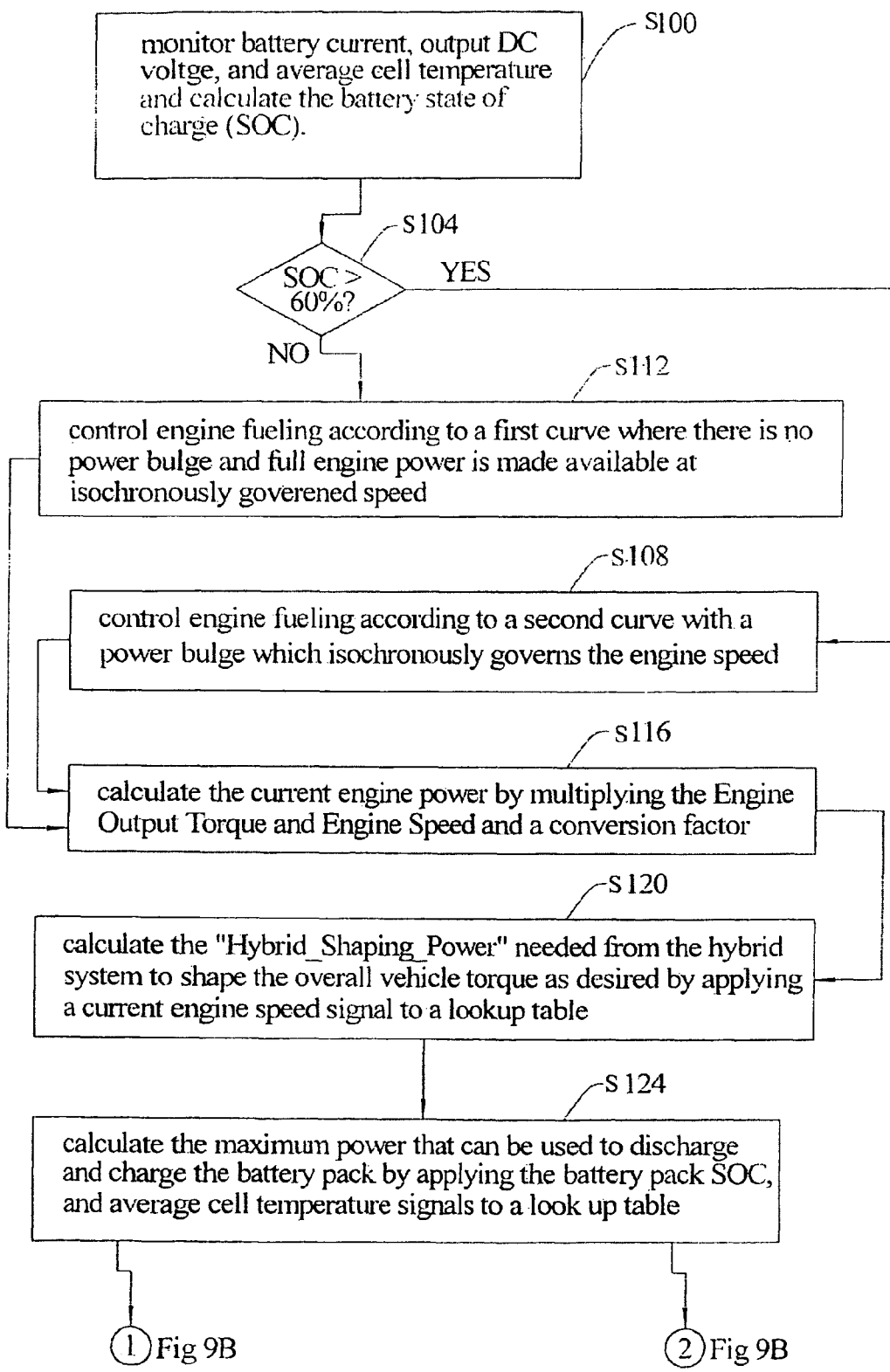

FIGS. 9A and 9B illustrate an example of exemplary method steps. In step S100, the ECU and/or the battery control monitors the battery pack current, output DC voltage, and average cell temperature and calculates the battery pack state of charge (SOC). In step S104 the state of charge is compared to a 60% value. If the battery pack SOC is greater than 60%, in step S108, the engine is controlled according to the second curve with a power bulge which isochronously governs the engine speed as shown in FIG. 5. If the battery pack SOC is less than 60% in step S112, the engine is controlled according to the first curve where there is no power bulge and full engine power is made available at isochronously governed speed shown in FIG. 4. In step S116 after either step S108 or step S112, the current engine power is calculated by multiplying the Engine Output Torque and Engine Speed and a conversion factor. After step S116, in a step S120, the "Hybrid_Shaping_Power" needed from the hybrid system to shape the overall vehicle torque as desired is calculated by applying a current engine speed signal to a look up table. In step S124 the maximum power than can be used to discharge and charge the battery pack is calculated by applying the battery pack SOC, and average cell temperature signals to a look up table. For charging, in a step S128 the amount of power available for charging the battery pack is calculated by subtracting current engine power and the current hybrid assist from the "rated power" (either 317 kW or 303 kW depending on the curve selected). In step S132, the desired hybrid system power is compared to the maximum allowable charge power, and if the desired hybrid system power is less than (more negative) the maximum allowable charge power the hybrid system power command is limited to the maximum allowable charge power. After step S124, for electric power assist, in step S136, calculate the desired hybrid system power by subtracting the available engine power from the "Hybrid_Shaping_Power." Next, in step S140, the desired hybrid system power is compared to the max allowable discharge power and if the desired hybrid system power exceeds the max allowable discharge power, the hybrid system power command is limited to the max allowable discharge power. Next, in step S144, an inverter torque command is generated by dividing the hybrid system power command by the motor/generator speed as reported by the inverter control 35 (in rad/sec) to calculate a torque command in Nm units. In step S148 the inverter control 35 applies the torque command to a lookup table (predetermined by test) that specifies the current magnitude and phase angle needed to make the motor/generator produce that torque.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A hybrid drive system for a combine, comprising:
an engine driving an output;
an engine control which produces a current engine load signal and an engine speed signal;
a battery pack;
a motor and a generator operatively connected to the output arranged to be used alternately, the motor usable to drive the output and the generator usable to be driven by the output;
a motor/generator control that is signal-connected to the motor and to the generator to control operation of the motor and generator;
a hybrid system control; and
wherein the hybrid system control receives a battery pack state-of-charge (SOC) signal from the battery pack, and the hybrid system control also receives the current engine load signal and current engine speed signal from the engine control, and depending upon the SOC signal, the current engine load signal and the current engine speed signal, sends a torque command to the motor/generator control to provide a desired composite speed-torque curve from the engine and the motor;
wherein the engine control governs engine speed at a selected isochronous speed.

2. The system according to claim 1, wherein if the SOC signal is below a pre-selected value, an engine fuel curve is set by engine control to provide maximum engine power at isochronous speed, and if the SOC signal is above a pre-selected value, the engine fuel curve is reduced and the motor/generator control does not operate the motor until engine speed falls below a pre-determined value below isochronous speed.

3. The system according to claim 1, wherein:
the hybrid system includes a battery pack control that continuously monitors battery current, individual cell voltage, and individual cell temperature, and calculates the battery pack state of charge (SOC), the battery pack control also measures an output DC voltage, and the battery pack control reports the value of SOC, and average cell temperature as a sum of all cell temperatures divided by the number of cells, to the hybrid system control.

4. The system according to claim 1, wherein:
the motor/generator control comprises an inverter, the motor/generator control receives a torque command from the hybrid system control, the inverter takes this torque command, and applies the value to a lookup table that specifies a current magnitude and phase angle needed to make the motor or generator produce that torque, the inverter then uses current regulation to generate currents in the motor or generator which then produces the desired torque on the output, depending upon the torque command, the power flow can be either from the battery pack converted to mechanical power in the engine output or the power flow can convert mechanical power from the engine to output electrical power which is then stored in the battery pack, the inverter also interfaces to a position sensor on the motor/generator to calculate speed of the motor or generator.

5. The system according to claim 1, wherein:
the motor and generator are coupled to the output via a gearbox and the torque produced by the motor or generator adds or subtracts to that of the engine, and the motor or generator speed has a fixed ratio to speed of the engine.

6. The system according to claim 1, wherein:
when the battery pack is charged to a pre-determined SOC, the engine control controls fueling to the engine, the engine control monitors the amount of fuel it is applying and also monitors the engine speed, the fueling is controlled so that the speed is isochronously governed at the isochronous speed with a power bulge, the engine control regulates the speed of the engine until the engine torque reaches a rated condition, after the torque reaches the rated condition, the engine control no longer governs the speed to the isochronous speed, the engine control commands additional torque in proportion to the difference between the current speed and the isochronous speed.

7. The system according to claim 1, wherein the engine control is able to command the motor/generator control to produce a desired torque in the motor or generator via a CAN bus.

8. A hybrid drive system for a combine, comprising:
an engine driving an output;
an engine control which produces a current engine load signal and an engine speed signal;
a battery pack;
a motor and a generator operatively connected to the output arranged to be used alternately, the motor usable to drive the output and the generator usable to be driven by the output;
a motor/generator control that is signal-connected to the motor and to the generator to control operation of the motor and generator;
a hybrid system control; and
wherein the hybrid system control receives a battery pack state-of-charge (SOC) signal from the battery pack, and the hybrid system control also receives the current engine load signal and current engine speed signal from the engine control, and depending upon the SOC signal, the current engine load signal and the current engine speed signal, sends a torque command to the motor/generator control to provide a desired composite speed-torque curve from the engine and the motor; wherein the engine control performs the following calculations:
the engine control determines if it should be using a first or second power-speed curve for engine speed governing, if the battery pack SOC is less than a first pre-determined value, the engine control uses the first power-speed curve; if the battery pack SOC is greater than the first pre-determined value, the engine control uses the second power-speed curve;
the engine control calculates current engine power by multiplying engine output torque and engine speed and a conversion factor;
the engine control calculates power needed from the motor by applying the engine speed signal to a first look up table of pre-calculated values to output a power signal;
the engine control calculates maximum power than can be used to discharge and charge the battery pack by applying the battery pack SOC signal and average cell temperature signals to a second look up table of values predetermined by test which outputs the maximum allowable discharging and charging current, these currents are then multiplied by a battery pack output voltage to determine the maximum allowable power to be used for discharging and charging;
the engine control calculates desired motor or generator power by subtracting the available engine power from the power signal;
if the desired motor or generator power exceeds the maximum allowable discharge power or is less than the maximum allowable charge power, the motor or generator power is limited to the maximum allowable discharge power or the maximum allowable charge power.

9. The system according to claim 8, wherein the engine control calculates the amount of power it has available for charging the battery pack by subtracting current engine power and the current power from the motor or generator from the rated power depending on the first or second power-speed curve selected; and
the torque command is generated by dividing the command power from the motor or generator by the motor/generator speed as reported by the inverter.

10. The system according to claim 9, wherein when the SOC is below 40% the amount of allowable discharge current is linearly reduced from the value at 40% to 0 Amps at 30% SOC; and
when the SOC is above 60% the amount of allowable charge current is linearly reduced from the value at 60% to 0 Amps at 70% SOC.

11. A hybrid drive system for a combine, comprising:
an engine driving an output;
an engine control which produces a current engine load signal and an engine speed signal;
a battery pack;
a motor and a generator operatively connected to the output arranged to be used alternately, the motor usable to drive the output and the generator usable to be driven by the output;
a motor/generator control that is signal-connected to the motor and to the generator to control operation of the motor and generator;
a hybrid system control; and
wherein the hybrid system control receives a battery pack state-of-charge (SOC) signal from the battery pack, and the hybrid system control also receives the current engine load signal and current engine speed signal from the engine control, and depending upon the SOC signal, the current engine load signal and the current engine speed signal, sends a torque command to the motor/generator control to provide a desired composite speed-torque curve from the engine and the motor; wherein from 60% to 70% SOC of the battery pack the ability to charge the battery is linearly de-rated to 0% to protect battery life, from 40% to 30% SOC of the battery pack the ability to discharge the battery is linearly de-rated to 0% to protect battery life, between 40% and 60% SOC of the battery pack the battery pack charging and discharging is not de-rated.

12. A hybrid drive system for a combine, comprising:
an engine driving an output;
an engine control which produces a current engine load signal and an engine speed signal;
a battery pack;
a motor and a generator operatively connected to the output arranged to be used alternately, the motor usable to drive the output and the generator usable to be driven by the output;
a motor/generator control that is signal-connected to the motor and to the generator to control operation of the motor and generator;
a hybrid system control; and
wherein the hybrid system control receives a battery pack state-of-charge (SOC) signal from the battery pack, and the hybrid system control also receives the current engine load signal and current engine speed signal from the engine control, and depending upon the SOC signal, the current engine load signal and the current engine speed signal, sends a torque command to the motor/generator control to provide a desired composite speed-torque curve from the engine and the motor; wherein the engine control isochronously governs the engine at a desired isochronous speed;
the isochronous speed is held until the engine speed reaches rated power; once engine load exceeds rated power the engine control allows a linear droop in speed and corresponding increase in power to a peak power point.

13. A hybrid drive system for a combine, comprising:
an engine having a rotary output;
an engine control;
a battery pack;
a three phase inverter and an inverter control;
a motor and a generator arranged to be used alternately connected to the rotary output;
a hybrid system control, wherein the hybrid system control receives state of charge (SOC) of the battery pack, battery pack voltage, battery pack current, and safe operating current limits to/from the battery pack, and the hybrid system control also receives the current engine load estimate and engine speed from the engine control, and depending upon these variables, a torque command is sent to the inverter control to provide a desired composite speed-torque curve for the engine and the motor wherein the engine control governs the engine at a selected isochronous speed.

14. The system according to claim 13, wherein when the battery pack can be charged, an engine fuel curve is set to provide maximum engine power at isochronous speed, the battery pack is charged and provides a power bulge as needed by a combination of battery pack power and slowly releasing battery charging power as the engine speed droops, when the battery pack is fully charged, the engine fuel curve is reduced so that battery pack power is not engaged until engine speed falls below a pre-determined value less than isochronous speed.

15. The system according to claim 13, wherein:
the battery pack continuously monitors battery current, individual cell voltage, and individual cell temperature, from these measurements the battery pack calculates the battery state of charge (SOC), the battery pack also measures the output DC voltage, the battery pack reports the value of its SOC, average cell temperature, and output voltage to the ECU over the CAN bus.

16. The system according to claim 13, wherein: the inverter control receives a torque command over the CAN bus from the ECU, the inverter control takes this torque command and applies the value to a lookup table that specifies the current magnitude and phase angle needed to make the motor or generator to produce that torque, the inverter control then uses current regulation to generate these currents in the motor or generator which then produces the desired torque on the shaft, depending upon the torque command, the power flow can be either from the battery converted to mechanical power to support the engine or the flow can convert mechanical power to electrical which is then stored in the battery.

17. The system according to claim 13, wherein:
the motor or generator is connected to the engine from which the torque produced by the motor or generator adds or subtracts to that of the engine, and the motor or generator speed has a fixed ratio to that of the engine.

18. A traction drive for a combine harvester, comprising:
an internal combustion engine having a power of less than 560 kW at rated speed and having peak power over 560 kW at a peak power speed less than rated speed;
an electric motor;
at least one battery, wherein the battery is arranged to drive the electric motor;
a control that causes the at least one battery to power the motor, wherein the electric motor couples with the internal combustion engine to provide the traction drive with over 600 kW power at the peak power speed.

19. The traction drive according to claim 18, wherein the internal combustion engine exhausts into an emission control system having an selective catalyst reduction unit and no diesel particulate filter unit and no exhaust gas recirculation unit.

20. The traction drive according to claim 18, wherein the internal combustion engine comprises a 13.5 L displacement engine.

21. A traction drive for a combine harvester, comprising:
an internal combustion engine having a power at rated speed of less than 560 kW;
an electric motor;
at least one battery, wherein the battery is arranged to drive the electric motor;
a control that causes the at least one battery to power the motor, wherein the electric motor couples with the internal combustion engine to provide the traction drive with over 560 kW power;
wherein
the power level of the engine at rated speed is set to about 480 kW;
moving down the torque curve to a second speed less than rated speed, the engine power would taper up to about 500 kW and in addition, the electric motor will build power linearly from 0 kW at rated speed to about 40 kW at the second engine speed for a combined power of about 540 kW at the second engine speed; and if overloading occurs above about 540 kW, the engine will build to a peak power of about 560 kW at a third engine speed less than the second engine speed and the electric motor will build to about 50 kW for a combined power of over 600 kW at the third engine speed.

* * * * *